(12) United States Patent
Kimura et al.

(10) Patent No.: US 7,025,463 B2
(45) Date of Patent: Apr. 11, 2006

(54) REAR PROJECTION TELEVISION WITH SCREEN PANEL FOR RECEIVING PROJECTION LIGHT

(75) Inventors: Keishi Kimura, Matsumoto (JP); Chihiro Tsukinokizawa, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 38 days.

(21) Appl. No.: 10/779,722

(22) Filed: Feb. 18, 2004

(65) Prior Publication Data

US 2004/0227902 A1 Nov. 18, 2004

(30) Foreign Application Priority Data

Mar. 6, 2003 (JP) .............................. 2003-060263
Jan. 19, 2004 (JP) .............................. 2004-010521

(51) Int. Cl.
G03B 21/14 (2006.01)
G03B 21/20 (2006.01)
G03B 21/22 (2006.01)
G03B 21/26 (2006.01)

(52) U.S. Cl. ........................... 353/85; 353/87; 353/94; 353/119

(58) Field of Classification Search ................ 362/254, 362/227; 348/787, 794; 359/460; 353/29, 353/72, 74, 77, 78, 85, 94, 119, 122
See application file for complete search history.

(56) References Cited

U.S. PATENT DOCUMENTS 6,467,911 B1 * 10/2002 Ueyama et al. ................ 353/87
6,860,608 B1 * 3/2005 Kimura ........................ 353/85

FOREIGN PATENT DOCUMENTS

JP           A 9-98355          4/1997

* cited by examiner

*Primary Examiner*—Melissa Jan Koval
(74) *Attorney, Agent, or Firm*—Oliff & Berridge, PLC

(57) ABSTRACT

There is provided a rear projection television having a construction which facilitates replacement of a light source lamp and repair work within the body. The rear projection television includes a screen panel disposed at the front of a cabinet thereof, for receiving projection light projected from behind for image display, to thereby display an image thereon, a light source lamp removably disposed within the cabinet, for projecting the projection light, and a working door provided in the front face of the cabinet. An opening-detecting sensor detects opening of the working door and outputs an opening-detecting signal. An illumination section for replacement work disposed within the cabinet illuminates the inside of the body. The control section causes the illumination section to light when the opening-detecting signal is outputted by the opening-detecting sensor.

7 Claims, 4 Drawing Sheets

REAR PROJECTION TELEVISION WITH SCREEN PANEL FOR RECEIVING PROJECTION LIGHT

BACKGROUND OF THE INVENTION

1. Field of the Invention

The present invention relates to a rear projection television in which projection light is projected from behind a screen panel to thereby display an image on the screen panel.

2. Description of the Related Art

With proliferation of digital broadcasting and widespread use of digital AV (audio-visual) apparatuses in recent years, there has been a growing demand for televisions capable of displaying images of high quality on respective large screens. As a television of this kind, a rear projection television has been conventionally proposed which displays images by the rear projection method. In the rear projection television, a projector disposed within a cabinet projects projection light onto a light transmission screen panel disposed at the front of the cabinet, from behind, to thereby display an image on the screen panel. In this case, the projector includes a light source lamp, such as a high-pressure mercury-vapor lamp, which is capable of projecting a large amount of projection light, so that the rear projection television is capable of displaying images of high quality on the large screen panel. However, in general, a light source lamp of a projector can burn out after approximately 10,000 hours of use. When the light source lamp of a projector burns out, it is required to detach a rear panel secured to the rear of the cabinet by screws and replace the burned-out light source lamp with a new one. Further, the rear projection television is generally placed with its rear face close to a wall surface of a room. This makes it necessary to move the body of the rear projection television to detach the rear panel of the cabinet and replace the light source lamp. Therefore, the rear projection television of the above mentioned kind presents a problem that a user has to do troublesome work of moving the rear projection television and detaching the rear panel for replacement of the light source lamp.

To solve the above problem, a liquid crystal projection television receiver has been disclosed in Japanese Laid-Open Patent Publication (Kokai) No. 9-98355, in which a housing rack of a cabinet has a wall thereof formed with a window for use in replacing a light source lamp unit. In the case of this liquid crystal projection television receiver, the user opens a lid mounted to an opening edge of the window, and then inserts a hand from the window to thereby replace a light source lamp unit accommodated in the cabinet. Therefore, the liquid crystal projection television receiver eliminates the need for moving the apparatus body of the liquid crystal projection television receiver and detaching the rear panel of the cabinet.

However, from the study of the above described liquid crystal projection television receiver, the inventor found out the following problem: In general, the inside of the cabinet of a liquid crystal projection television receiver of this kind is dark. This makes it difficult for the user to view the light source lamp unit through the window of the cabinet, and hence he has to grope for the light source lamp unit to replace the same. Therefore, this liquid crystal projection television receiver suffers from the problem of difficulty of the very work of replacing the light source lamp unit. In this case, a method which can be employed by the user is to illuminate the inside of the cabinet e.g. by a flashlight. In this method, however, the user can use only one hand to mount or remove the light source lamp unit, and hence it still remains difficult to carry out the very work of replacing the light source lamp unit.

SUMMARY OF THE INVENTION

The present invention has been made in view of the above problems, and a main object thereof is to provide a rear projection television having a construction which facilitates replacement of a light source lamp and repair work within the body of the television.

To attain the above object, the present invention provides a rear projection television including a screen panel disposed at the front of a body of the rear projection television, for receiving projection light projected from behind for image display, to thereby display an image thereon, a light source lamp removably disposed within the body, for projecting the projection light, and a working door provided for the body, the rear projection television comprising a detector section that detects opening of the working door and outputs a detection signal, an illumination lamp disposed within the body, for illuminating an inside of the body, and a control section that causes the illumination lamp to light when the detection signal is outputted by the detector section.

According to this rear projection television, when the working door is opened, the detector section detects opening of the working door and outputs the detection signal, and in response to the detection signal, the control section causes the illumination lamp to light to illuminate the inside of the body. This makes it possible to view the light source lamp clearly through the opening opened by the working door. Further, it is no longer necessary to illuminate the inside of the apparatus body e.g. by a flashlight, and therefore, a user can use both hands to remove and mount light source lamps and carry out repair work within the body, which facilitates replacement of a burned-out light source lamp and repair work within the body.

It is preferable that the working door is arranged for opening and closing a replacement work opening formed in the body for replacement of the light source lamp, and the illumination lamp illuminates an area around the light source lamp. With this arrangement, when the working door is opened, the replacement work opening becomes open, and the illumination lamp illuminates the area around the light source lamp. Therefore, the area around the light source lamp can be clearly viewed through the opening, which makes it possible to replace a burned-out light source lamp more easily.

Preferably, the control section stops supply of electric power to the light source lamp when the detection signal is outputted by the detector section. With this arrangement of the preferred embodiment, even when the replacement work is performed without turning off a switch for switching between supply and cutoff of the supply of electric power to the light source lamp, since the supply of electric power to the light source lamp has already been cut off, the user can perform the replacement work without receiving an electric shock even if the user's hand touches e.g. a socket for the light source lamp.

Preferably, the control section causes the illumination lamp to flash when the detection signal is outputted by the detector section in a state where electric power is supplied to the light source lamp. With this arrangement of the preferred embodiment, when the replacement work is performed without turning off the switch for switching between supply and cutoff of the supply of electric power to the light source lamp, the flashing of the illumination lamp informs the user of the abnormal operation, so that the user can turn off the switch. Further, even when the rear projection television is not provided with the switch, the user can perform the work cautiously. Thus, it is possible to safely carry out replacement work on the light source lamp.

Preferably, the illumination lamp is capable of emitting red light. With this arrangement of the preferred embodiment, since a red light is generally more effective in attracting the attention of a person than lights of the other colors, it is possible to inform the user more positively that the user should be careful.

Preferably, the illumination lamp is formed by a solid light source. With this arrangement, since the solid light source is generally excellent in durability and efficiency, the area around the light source lamp can be efficiently illuminated over a long time period.

Preferably, the rear projection television comprises a main power supply for supplying electric power to the light source lamp, and an auxiliary power supply for supplying electric power to the illumination lamp, and the auxiliary light source is capable of storing electric charge. With this arrangement, even when an AC plug of the television is not connected to a commercial AC power outlet, it is possible to illuminate the inside of the body.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Figure 1:
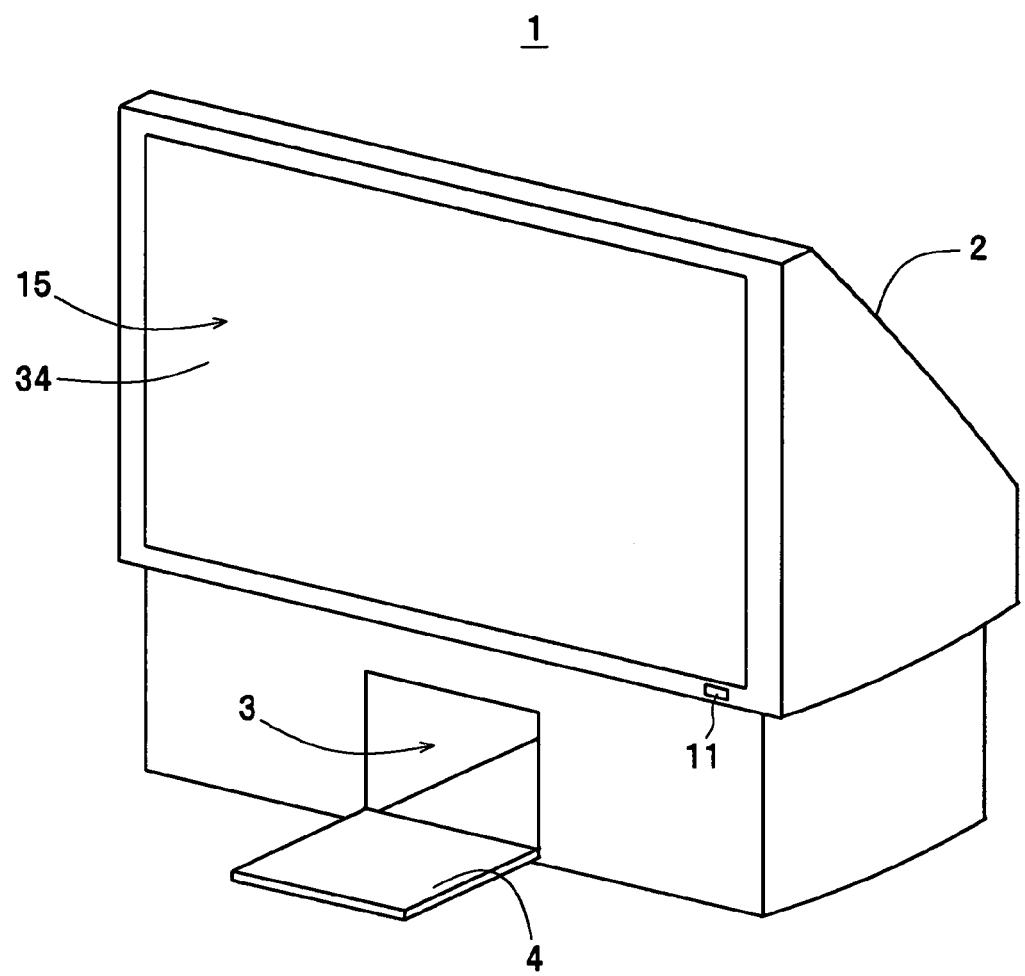
FIG. 1 is a perspective view of the appearance of a television according to an embodiment of the present invention.
Figure 2:
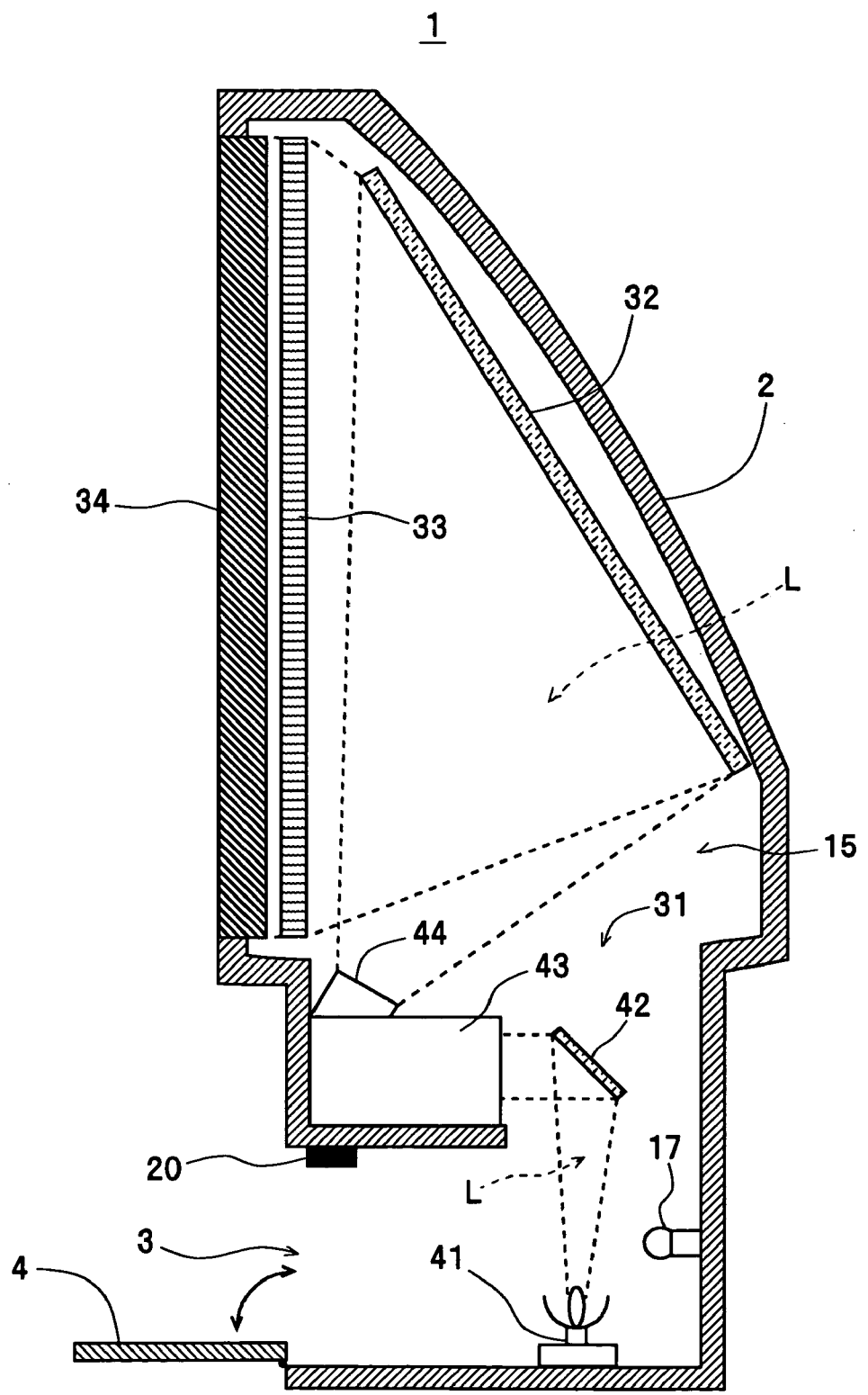
FIG. 2 is a side cross-sectional view schematically showing the arrangement of the television.
Figure 3:
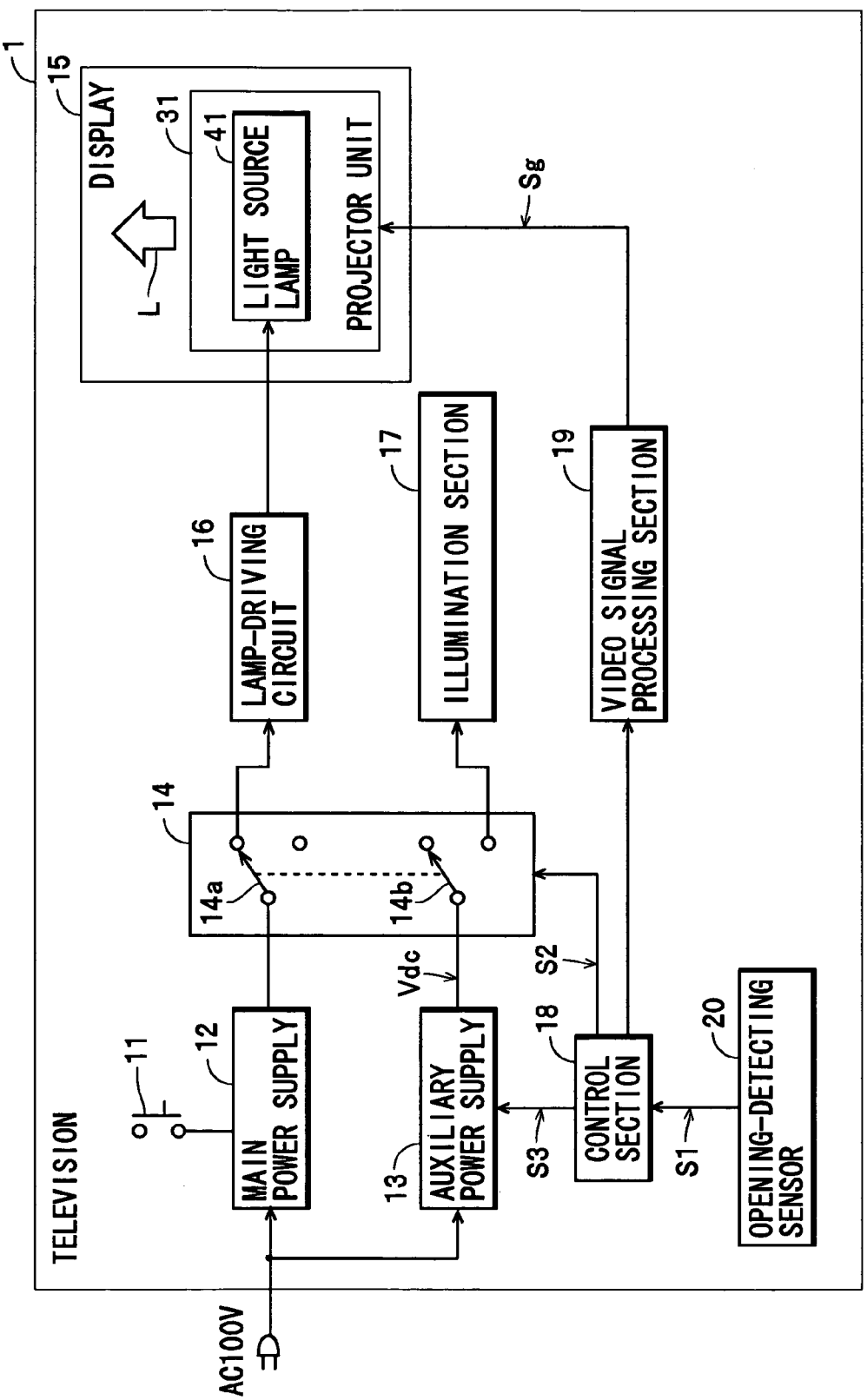
FIG. 3 is a block diagram showing the arrangement of the television.

The invention will now be described with reference to the accompanying drawings showing the best mode of the present invention. First, a description will be given of the arrangement of a rear projection television (hereinafter also simply referred to as "the television") 1. As shown in FIGS. 1 and 2, the television 1 is capable of displaying an image on a screen panel 34 that is disposed at the front of a cabinet (body) 2 and forms a part of a display 15 described in detail hereinafter, by projecting projection light L from behind the screen panel 34. More specifically, as shown in FIG. 3, the television 1 is comprised of a main switch 11, a main power supply 12, an auxiliary power supply 13, a switch 14, the display 15, a lamp-driving circuit 16, an illumination section 17 for replacement work, a control section 18 and an opening-detecting sensor 20. These component parts and elements are accommodated in the cabinet 2 or mounted on the outside of the cabinet 2. Further, as shown in FIGS. 1 and 2, an opening (replacement work opening) 3 for use in replacement of a light source lamp 41 of a projector unit 31, referred to hereinafter, is formed in a lower portion of the front face of the cabinet 2. The cabinet 2 has a working door 4 that can open/close the opening 3.

The main switch 11 for turning on the main power supply 12 is disposed on the front face of the cabinet 2 as shown in FIG. 1. The main power supply 12 outputs electric power to the lamp-driving circuit 16 via the switch 14 as shown in FIG. 3. The main power supply 12 generates electric power when the main switch 11 is turned on, and stops generation of electric power (i.e. stop outputting electric power) when the main switch 11 is turned off. Irrespective of the ON/OFF states of the main switch 11, the auxiliary power supply 13 generates an auxiliary DC voltage when an AC plug, not shown, is connected to a commercial AC power outlet, and supplies the auxiliary DC voltage to various sections including the control section 18. Further, as long as a flashing instruction signal S3 is not outputted from the control section 18, the auxiliary power supply 13 continuously outputs a DC voltage Vdc for lighting the illumination section 17, whereas when the flashing instruction signal S3 is outputted from the control section 18, the auxiliary power supply 13 repeatedly outputs and stops outputting the DC voltage Vdc at a predetermined repetition period.

As shown in FIG. 3, the switch 14 is comprised of a first switching element 14a and a second switching element 14b which are switched in a manner interlocked with each other, in response to a control signal S2 outputted from the control section 18. More specifically, as long as the control signal S2 is not outputted, the switch 14 is held in a state shown in FIG. 3 where the DC voltage generated by the auxiliary power supply 13 is not supplied to the illumination section 17, but the electric power generated by the main power supply 12 is supplied to the lamp-driving circuit 16 via the first switching element 14a. On the other hand, when the control signal S2 is outputted, the switch 14 is switched from the state shown in FIG. 3 to a state where the electric power generated by the main power supply 12 is not supplied to the lamp-driving circuit 16 via the first switching element 14a, but the DC voltage generated by the auxiliary power supply 13 is supplied to the illumination section 17.

As shown in FIG. 2, the display 15 is comprised of the projector unit 31, a mirror 32, a Fresnel lens 33, and a screen panel 34. The projector unit 31 is comprised of the light source lamp 41, a mirror 42, modulation means 43 and a projection lens 44 as shown in FIG. 2. In the present embodiment, the projector unit 31 is disposed in a lower portion of the cabinet 2, and projects the projection light L toward the mirror 32, for displaying an image based on a video signal Sg outputted from a video signal processing section 19.

The light source lamp 41 is removably mounted on a rear portion of the inner bottom surface of the cabinet 2, as shown in FIG. 2, and projects the incident light L (white light) upward. In the television 1 of the present embodiment, the light source lamp 41 is implemented e.g. by a high-pressure mercury-vapor lamp capable of projecting a large amount of incident light L. The mirror 42 reflects the incident light L from the light source lamp 41 toward the modulation means 43. The modulation means 43 includes a liquid crystal valve (not shown) comprised of a liquid crystal panel, an incident-side polarizing plate, and an irradiation-side polarizing plate, and modulates the incident light L (white light) from the light source lamp 41 into projection light L that can be displayed as an image on the screen panel 34. The projection lens 44 magnifies the projection light L and projects the same onto the mirror 32.

The mirror 32 is disposed in an upper rear portion of the inside of the cabinet 2 to reflect the projection light L from the projector unit 31 toward the Fresnel lens 33. The Fresnel lens 33 is disposed between the mirror 32 and the screen panel 34 to convert the projection light L projected from the projector unit 31 and reflected by the mirror 32 into parallel light (in a broad sense) and project the parallel light onto the screen panel 34. The screen panel 34 is a transmission screen which is disposed, as shown in FIG. 2, at the front of the cabinet 2 to receive the projection light L projected from behind by the projector unit 31 (i.e. the projection light L reflected by the mirror 32) and thereby displays an image.

The lamp-driving circuit 16 is a so-called ballast which has the function of generating high voltage required for light emission by the light source lamp 41 and stabilizing and maintaining the light emission. The illumination section 17, which corresponds to an illumination lamp according to the present invention, is formed e.g. by an LED (light emitting diode: example of a solid light source in the present invention) emitting red light. The illumination section 17 is disposed, as shown in FIG. 2, on a lower portion of the inner rear surface of the cabinet 2 to illuminate an area around the light source lamp 41 (the inside of the cabinet 2).

The control section 18 controls power supply to the light source lamp 41 and the illumination section 17. More specifically, when an opening-detecting signal (detection signal) S1 is outputted by the opening-detecting sensor 20 in a state where the supply of electric power from the main power supply 12 has been stopped by turning off the main switch 11, the control section 18 outputs the control signal S2 to the switch 14, whereby the DC voltage Vdc generated by the auxiliary power supply 13 is supplied to the illumination section 17 via the second switching element 14b of the switch 14. On the other hand, when the opening-detecting signal S1 is outputted in a state where electric power is supplied to the lamp-driving circuit 16 from the main power supply 12 via the first switching element 14a of the switch 14 with the main switch 11 kept on, the control section 18 not only outputs the control signal S2 to the switch 14, but also outputs the flashing instruction signal S3 to the auxiliary power supply 13 to cause the auxiliary power supply 13 to repeatedly output and stop outputting the DC voltage Vdc at the predetermined repetition period, thereby causing flashing of the illumination section 17. Further, the control section 18 performs centralized control of the projector unit 31 and the video signal processing section 19.

The video signal processing section 19 is comprised e.g. of a tuner, an IF circuit, an audio detection circuit, a video detection circuit and an amplifier circuit (none of which are shown). The video signal processing section 19 extracts a broadcast signal of a frequency corresponding to a channel selected e.g. by operation of a remote control, not shown, and outputs an audio signal to an audio output section, not shown, and a video signal Sg to the projector unit 31. The opening-detecting sensor 20, which corresponds to a detector section according to the present invention, is disposed at an upper edge of the opening 3 of the cabinet 2 as shown in FIG. 2. The opening-detecting sensor 20 outputs the opening-detecting signal S1 when the working door 4 is opened, and stops outputting the opening-detecting signal S1 when the working door 4 is closed.

Next, the overall operation of the television 1 will be described with reference to the drawings. It is assumed that in an initial state, the switch 14 is held in the state shown in FIG. 3.

In the television 1, when the AC plug is connected to a commercial AC power outlet, the auxiliary power supply 13 generates the DC voltage and supplies the DC voltage to the various sections including the control section 18. Then, when the main switch 11 is turned on, the main power supply 12 generates and outputs electric power. As a result, the electric power is supplied to the lamp-driving circuit 16 via the first switching element 14a of the switch 14, and the lamp-driving circuit 16 supplies the electric incident light L. Then, when a predetermined channel is designated e.g. by operation of the remote control, the video signal processing section 19 extracts a broadcast signal of a frequency corresponding to the designated channel, and outputs an audio signal to the audio output section, not shown, and a video signal Sg to the projector unit 31. Subsequently, the modulation means 43 of the projector unit 31 modulates the incident light L (white light) projected from the light source lamp 41 and reflected by the mirror 42 into projection light L shaded and colored according to an image based on the video signal Sg for video display. At this time, as shown in FIG. 2, the modulated projection light L is magnified by the projection lens 44, then reflected by the mirror 32, and subsequently converted into parallel light by the Fresnel lens 33, followed by being projected onto the rear surface of the screen panel 34. This causes the image to be displayed on the screen panel 34.

Next, a procedure of replacing a burned-out light source lamp 41 and operation of the television 1 during the replacement will be described with reference to the drawings. To replace the burned-out light, first, the main switch 11 of the television 1 is turned off. In response to this operation, the main power supply 12 stops generation of electric power. Then, the working door 4 of the cabinet 2 is opened as shown in FIG. 1. At this time point, the opening-detecting sensor 20 detects opening of the working door 4 and outputs the opening-detecting signal S1 to the control section 18. In response to this signal, the control section 18 outputs the control signal S2 to switch the switch 14.

As a result, the DC voltage Vdc is supplied to the illumination section 17 via the second switching element 14b of the switch 14, whereby the illumination section 17 illuminates the area around the light source lamp 41 (the inside of the cabinet 2) by emitting red light. Subsequently, the user puts his/her hand(s) into the opening 3, removes the light source lamp 41 from the inner bottom surface of the cabinet 2, and then mounts a new light source lamp 41. In doing this, the mounting position of the light source lamp 41 can be clearly viewed through the opening 3 owing to illumination by the illumination section 17, and hence it is possible to reliably remove and mount the light source lamps 41 with ease. Further, even if the main switch 11 is erroneously turned on during replacement of the light source lamp 41, and the user's hand touches a socket for the light source lamp 41, since the supply of electric power from the main power supply 12 to the lamp-driving circuit 16 has been cut off by the first switching element 14a of the switch 14, it is possible to reliably prevent occurrence of an electric shock accident.

Then, the working door 4 is closed to close the opening 3. When the opening 3 is closed, the opening-detecting sensor 20 stops outputting the opening-detecting signal S1. In response to this, the control section 18 stops outputting the control signal S2 to the switch 14. Consequently, the switch 14 is switched back to the state shown in FIG. 3, and the supply of the DC voltage Vdc to the illumination section 17 via the second switching element 14b of the switch 14 is stopped, whereby the illumination section 17 is extinguished. This completes the replacement of the light source lamp 41. Thereafter, when the main switch 11 is turned on, electric power is supplied from the main power supply 12 to the lamp-driving circuit 16 via the first switching element 14a of the switch 14. As a result, the light source lamp 41 is driven by electric power from the lamp-driving circuit 16 to be lit.

On the other hand, when the working door 4 is opened for replacement of the light source lamp 41 without turning off the main switch 11 as it should be, the control section 18 outputs the control signal S2 to switch the switch 14, and outputs the flashing instruction signal S3 to the auxiliary power supply 13 at the same time, based on the state of the main switch 11 and output of the opening-detecting signal S1 by the opening-detecting sensor 20. As a result, the first switching element 14a of the switch 14 is switched to the OFF state, whereby the supply of electric power from the main power supply 12 to the lamp-driving circuit 16 is stopped. Consequently, even when the user's hand touches the socket for the light source lamp 41, the user can perform lamp replacement without receiving an electric shock. Further, at this time, the second switching element 14b of the switch 14 is switched to the ON state, whereby the DC voltage Vdc from the auxiliary power supply 13 is supplied to the illumination section 17. In this case, since the auxiliary power supply 13 repeatedly outputs and stops outputting the DC voltage Vdc in response to the flashing instruction signal S3, the illumination section 17 flashes in red. As a result, the user becomes aware that he carried out the abnormal operation of opening the working door 4 without turning off the main switch 11 as it should be. Thus, the user is urged to turn off the main switch 11. Then, when the main switch 11 is turned off, the control section 18 judges that the abnormal operating state is eliminated, and stops outputting the flashing instruction signal S3. As a result, the auxiliary power supply 13 continuously outputs the DC voltage Vdc, whereby the illumination section 17 continuously illuminates in red. Thereafter, the light source lamp 41 is replaced following the same procedure as described hereinabove.

It should be noted that even when the working door 4 is opened in a state where the light source lamp 41 has not been burned out but remains normally illuminated, the control section 18 outputs the control signal S2 and the flashing instruction signal S3. Therefore, also in this case, the light source lamp 41 is turned off, and the illumination section 17 flashes.

As described above, according to the television 1, when the opening-detecting sensor 20 detects opening of the working door 4 and outputs the opening-detecting signal S1, the illumination section 17 illuminates the inside of the cabinet 2, so that the inside of the cabinet 2 can be clearly viewed through the opening 3. This enables a user inexperienced in lamp replacement and repair work within the cabinet 2 to insert a hand into the cabinet 2 without uneasiness that the user would feel if the inside of the cabinet 2 were dark. Further, since it is not necessary to illuminate the inside of the cabinet 2 e.g. by a flashlight, the user can use both hands to remove or mount the light source lamp 41 and carry out replacement work within the cabinet 2, which facilitates replacement of the light source lamp 41 which is burned out and repair work within the cabinet 2.

Further, when the working door 4 is opened, the opening 3 becomes open, and the illumination section 17 illuminates an area around the light source lamp 41. This enables the area around the light source lamp 41 to be clearly viewed through the opening 3, and therefore, it is possible to replace a burned-out light source lamp 41 more easily.

Furthermore, when the opening-detecting sensor 20 outputs the opening-detecting signal S1, the supply of electric power to the light source lamp 41 is stopped by switching the switch 14, so that the user can perform lamp replacement work with the main switch 11 kept on and without receiving an electric shock even when a hand touches the socket for the light source lamp 41.

Moreover, when the opening-detecting signal S1 is outputted by the opening-detecting sensor 20 in a state where electric power is supplied to the light source lamp 41, it is possible to cause flashing of the illumination section 17 to thereby inform the user that the abnormal operation of opening the working door 4 without turning off the main switch 11 was performed, and urge the user to turn off the main switch 11. Therefore, the user can avoid carrying out lamp replacement work in a state where electric power is supplied.

Further, since the illumination section 17 flashes in red when the working door 4 is open, it is possible to call the user's attention more positively. In addition, since the illumination section 17 is formed by an LED excellent in durability and efficiency, it is possible to illuminate the area around the light source lamp 41 efficiently over a long time period.

Figure 4:
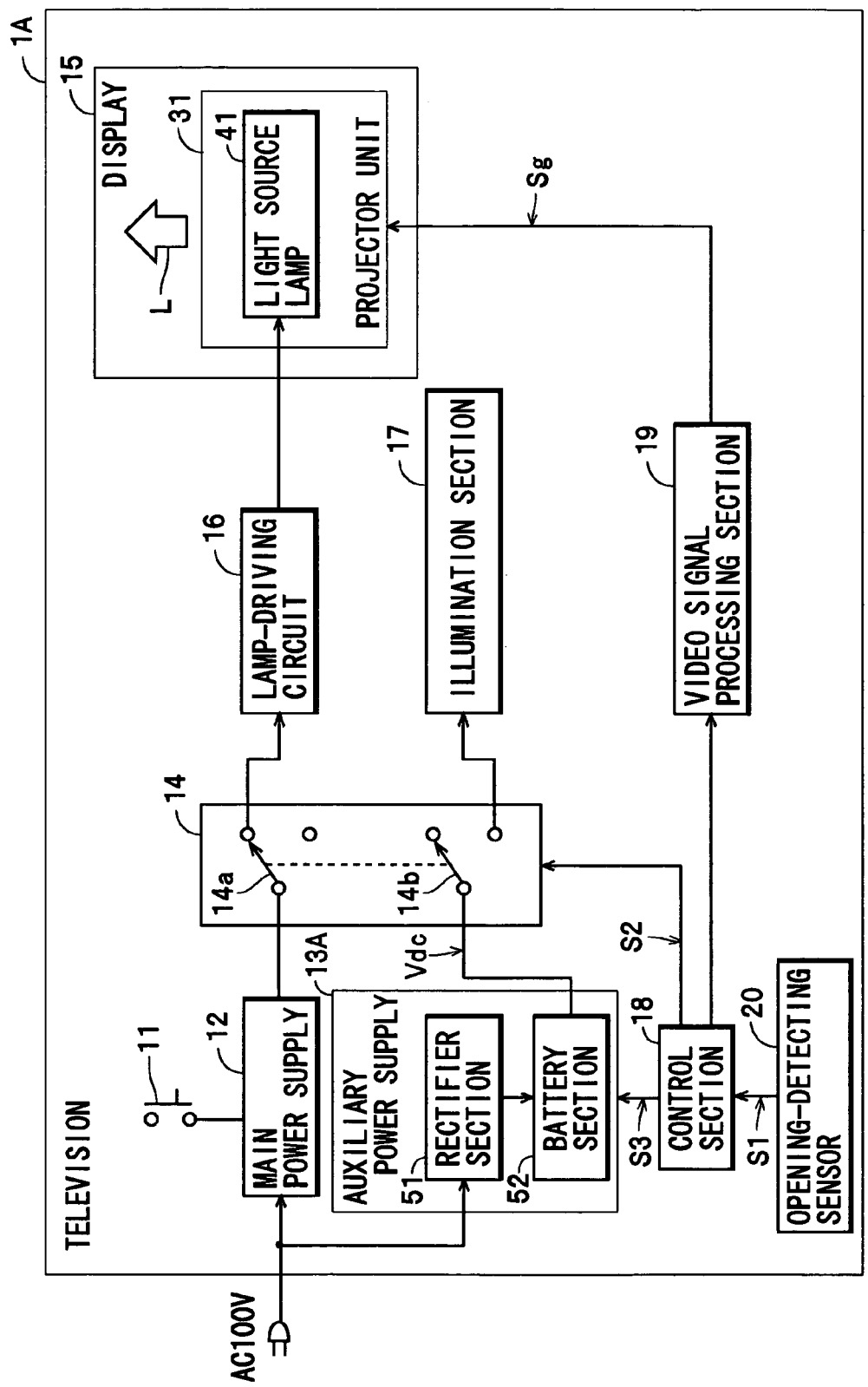
FIG. 4 is a block diagram showing the arrangement of a television according to another embodiment of the present invention.

It should be noted that the present invention is by no means limited to the above arrangement. Although in the above-described embodiment, the television is configured such that it is equipped with the auxiliary power supply 13 for supplying the auxiliary DC voltage to the related parts when the AC plug of the television is connected to the commercial AC power outlet, this is not limitative, but as shown in FIG. 4, it is also possible to employ the arrangement of a television 1A in which the auxiliary power supply 13 is replaced by an auxiliary power supply 13A which is capable of storing electric charge. In this case, the auxiliary power supply 13A is comprised of a rectifier section 51 for rectifying (converting) the commercial AC voltage to a DC voltage, and a battery section 52 implemented e.g. by one or both of a secondary cell and a capacitor, for being charged with the DC voltage obtained by the rectifier section 51. In this case, when the AC plug is connected to the commercial AC power outlet, the auxiliary power supply 13A operates similarly to the auxiliary power supply 13 described hereinabove, whereas when the AC plug is not connected, the auxiliary power supply 13A releases (discharges) electric power from the battery section 52, thereby applying an auxiliary DC voltage to the related parts, and also supplies a DC voltage Vdc continuously or intermittently at a predetermined repetition period, depending on whether or not the flashing instruction signal S3 is outputted from the control section 18. According to this television 1A, with provision of the auxiliary power supply 13A, it is possible to illuminate the inside of the cabinet 2 even when the AC plug is not connected to the commercial AC power outlet.

Further, although in the above-described embodiment, the control section 18 outputs the control signal S2 to switch the switch 14, the rear projection television 1 may be configured such that the switch 14 is directly switched by the opening-detecting signal S1. Further, although in the above-described embodiment, the illumination section 17 is formed by the LED that emits red light, an LED that emits light of a color other than red color can be employed, or any of various lamps, including an incandescent electric lamp, can be employed in place of the LED. Moreover, the illumination section 17 can be formed by an LED that emits red light and another LED that emits green light, for example, thereby causing the LED that emits green light to be continuously lit when the working door 4 is opened after the main switch 11 is turned off, and causing the LED that emits red light to flash when the working door 4 is opened without turning off the main switch 11. Further, although in the above-described embodiment, the description is given of the rear projection television 1, by way of example, this is not limitative, but the present invention can be applied to a television equipped with any one of a CRT, a liquid crystal panel, and a plasma display.

What is claimed is:

1. A rear projection television including a screen panel disposed at the front of a body of the rear projection television, for receiving projection light projected from behind for image display, to thereby display an image thereon, a light source lamp removably disposed within the body, for projecting the projection light, and a working door provided for the body, the rear projection television comprising:
   a detector section that detects opening of the working door and outputs a detection signal;
   an illumination lamp disposed within the body, for illuminating an inside of the body; and
   a control section that causes the illumination lamp to light when the detection signal is outputted by the detector section.

2. A rear projection television as claimed in claim 1, wherein the working door is arranged for opening and closing a replacement work opening formed in the body for replacement of the light source lamp, and
   wherein the illumination lamp illuminates an area around the light source lamp.

3. A rear projection television as claimed in claim 1, wherein the control section stops supply of electric power to the light source lamp when the detection signal is outputted by the detector section.

4. A rear projection television as claimed in claim 1, wherein the control section causes the illumination lamp to flash when the detection signal is outputted by the detector section in a state where electric power is supplied to the light source lamp.

5. A rear projection television as claimed in claim 4, wherein the illumination lamp is capable of emitting red light.

6. A rear projection television as claimed in claim 1, wherein the illumination lamp is formed by a solid light source.

7. A rear projection television as claimed in claim 1, comprising a main power supply for supplying electric power to the light source lamp, and an auxiliary power supply for supplying electric power to the illumination lamp, and
   wherein the auxiliary power supply is capable of storing electric charge.

* * * * *